June 4, 1935.  W. F. OLIVER  2,003,973
HYDRAULIC BRAKE
Filed March 17, 1932
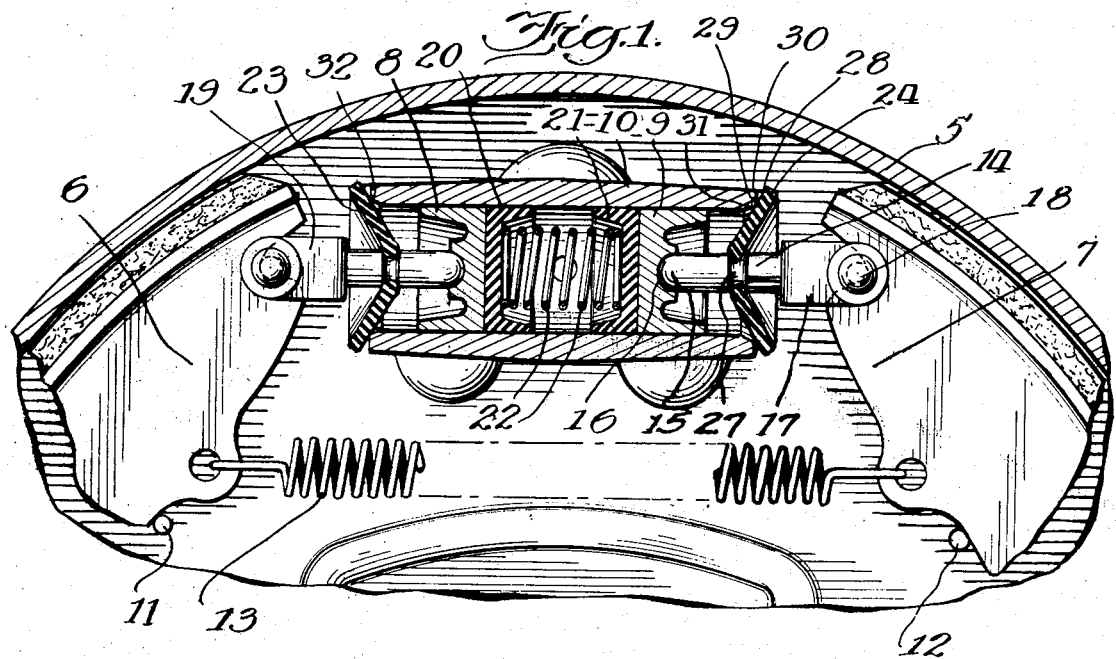
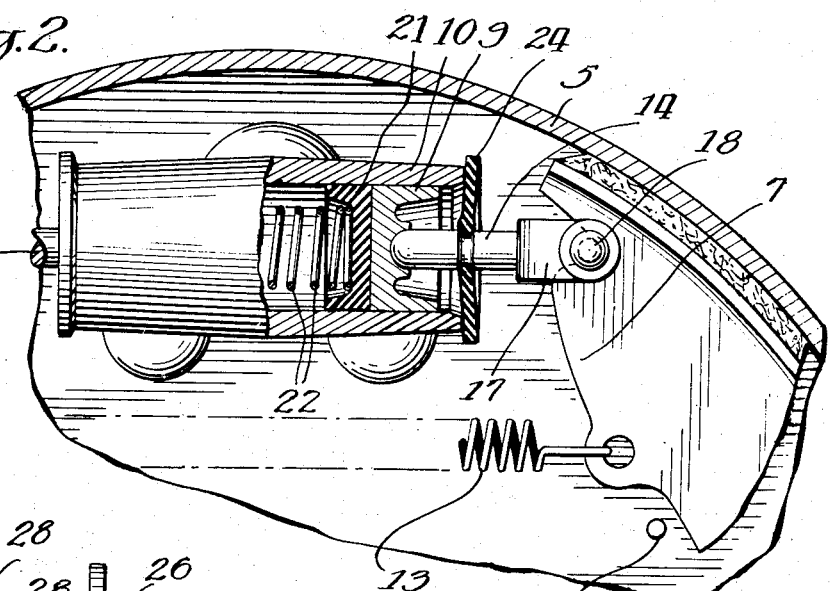
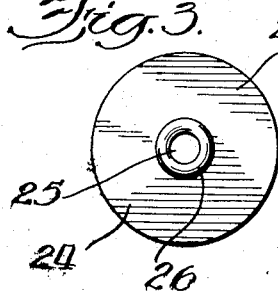
Inventor:
Wallace F. Oliver
By Williams, Bradbury,
McCaleb & Hinkle
Attys.

Patented June 4, 1935

2,003,973

UNITED STATES PATENT OFFICE 2,003,973

HYDRAULIC BRAKE

Wallace F. Oliver, Detroit, Mich., assignor to Hydraulic Brake Company, Detroit, Mich., a corporation of California Application March 17, 1932, Serial No. 599,478

5 Claims. (Cl. 60—54.6)

My invention pertains to hydraulic brakes and is particularly concerned with the sealing means commonly employed to seal the ends of the motor cylinders which move the brake shoes into engagement with the brake drum and which are commonly located at the vehicle wheels. These cylinders are exposed to dirt and moisture, and it is common practice to provide a boot to seal each end of the cylinder against the entry of such dirt and moisture.

The object of my invention is to provide a simpler form of sealing means which is more efficient and which is cheaper to manufacture and install.

Other objects and advantages will become apparent as the description proceeds.

In the drawing,

Fig. 1 is an elevation, partly in section, showing a motor cylinder and adjacent mechanism;

Fig. 2 is a fragmentary view similar to Fig. 1, but showing the parts in a different position;

Fig. 3 is an elevation of the sealing disk; and

Fig. 4 is an edgewise view of this disk.

Referring to the drawing, I have shown, in Figs. 1 and 2, a brake drum 5 and brake shoes 6 and 7 adapted to be moved into engagement with the brake drum 5 by pistons 8 and 9 located in a cylinder 10. The brake shoes 6 and 7 are normally held against stops 11 and 12 by a retractile spring 13, as shown in Fig. 1.

The piston 9 is connected with its brake shoe 7 through a piston rod 14 which has a rounded head 15 resting in a spherical socket 16 formed in the rear of the piston 9. The opposite end of the piston rod is yoke-shaped, as indicated at 17, and carries a pin 18 which rests in a suitable notch formed in the adjacent end of the brake shoe 7. It is apparent that the piston rod 14 is capable of pivotal movement with respect to both the piston 9 and the brake shoe 7 and is thus capable of accommodating the relative movement which occurs between the piston 9 and the adjacent end of the brake shoe upon each application of the brakes.

The piston 8 is similarly connected to its brake shoe 6 by piston rod 19. The pistons 8 and 9 are provided with rubber cup-shaped gaskets 20 and 21 which are held against the faces of the pistons by an interposed spring 22. This spring 22 also holds the pistons against the rounded ends of the piston rods and also holds the pins in the outer ends of the piston rods in engagement with the brake shoes. The spring 22, however, is much weaker than spring 13 and therefore spring 22 does not move the brake shoes away from the stops 11 and 12.

The opposite ends of the cylinder 10 are sealed by flexible disks 23 and 24 of rubber or other suitable material. The disk 24 has a central opening 25 surrounded by a thickened edge 26 which engages in a groove 27 properly located lengthwise of the piston rod 14.

The face 28 of the disk 24 abuts against an edge 29 formed at the junction of the flat end surface 30 and a suitably tapered surface 31. The opposite end of the cylinder is similarly provided with an edge 32 which is formed in the same manner as the edge 29, and the disk 23 is identical with the disk 24.

When the brake is not being used the various elements of the braking mechanism assume the position shown in Fig. 1. In this figure the brake shoes are resting against the stops 11 and 12, and the pistons and piston rods are in their innermost positions. The grooves in the piston rods are located inwardly of the edges 29 and 32, and the rubber disks are so distorted that they assume a conical shape. This distortion of the disks causes them to bear with considerable pressure against the edges 29 and 32 and to effectively seal the ends of the cylinder against the entry of any dirt or moisture.

When the brakes are applied the parts assume the positions shown in Fig. 2. In the position shown in Fig. 2 the groove 27 is closer to the plane of the edge 29, but the center of the groove is still located inwardly of said plane so that the disk 24 is still slightly distorted and thus maintained firmly in sealing contact with the edge 29. It is important that the mechanism be so designed that a hard application of the brakes will not move the groove 27 beyond the position shown in Fig. 2, even when the brake lining is badly worn. It is further important that the disk 24 be made of such diameter and thickness and the maximum movement of the piston rod bear such relation to the diameter of the edge 29, that the disk 24 will present a smooth conical surface which is firmly pressed against the edge 29.

My improved sealing means has a dirt removing function which will be apparent from the following observation: When the parts are in the normal position, i. e., the position shown in Fig. 1, there is an annular groove formed between the flat end surface 30 and the adjacent face 28 of the disk 24. This annular groove is V-shaped in cross-section and forms a collecting place for dirt and moisture which might eventually find its way into that part of the cylinder in rear of the piston were it not for the self-cleansing feature of my invention. As the parts move from the position shown in Fig. 1 to that shown in Fig. 2, the disk 24 flattens and increases in diameter. This produces an outward sliding movement of the face 28 of the disk relative to the edge 29 and also causes the face of the disk to close in against the end surface 30 of the cylinder. This radially outward movement of the disk 24 and inward movement of the disk toward the surface 30 squeezes out and carries away any dirt or moisture which may have collected in the annular V-shaped groove formed between the face 28 of the disk 24 and the end surface 30 of the cylinder.

Having thus described my invention, what I claim as new and desire to secure by Letters Patent of the United States is:

1. In brake mechanism of the class described, the combination of a cylinder, a piston therein, a piston rod for actuating a brake shoe, said cylinder presenting an edge, a sealing member carried by said rod, said sealing member comprising a stiff resilient disk, and means provided by said rod for engaging the central portion of said sealing member and thereby pressing the periphery thereof against said edge for all positions of said piston rod.

2. In brake mechanism of the class described, the combination of a wheel cylinder having an end, a piston reciprocably mounted in said cylinder and adapted to be moved outwardly by pressure created therein, a piston rod associated with said piston and adapted to move a brake element into engagement with a brake drum, a resilient rubber sealing member attached to said piston rod, said sealing member having its entire mass embodied in a disk-shaped structure and being of substantial rigidity, and a spring for holding said disk in sealing engagement with said end of said cylinder.

3. In mechanism of the class described, the combination of a cylinder, a piston reciprocable therein, a piston rod reciprocable with said piston, said piston rod having a groove therein, said cylinder having an end located beyond the outermost position of said groove, and a resilient sealing member having a part extending into said groove, said sealing member forming a sliding contact with said cylinder end, reciprocation of said piston and piston rod causing relative sliding movement between said sealing member and said cylinder end, said sliding contact being the only point of contact between said sealing member and said cylinder.

4. In mechanism of the class described, the combination of a cylinder having an end, a piston rod extending from said end, a resilient disk carried by said rod and thereby maintained in sealing engagement with said end to prevent the entry of impurities into said cylinder, and means for reciprocating said rod for effecting a radial movement of the surface of said disk relative to the end of said cylinder, thereby to discharge impurities from adjacent the seal formed between said disk and said end.

5. In a device of the class described, the combination of a bored cylinder having a beveled edge at the end thereof, a piston reciprocable in the bore of the cylinder and having a connected piston rod projecting from the beveled edge end of the cylinder bore, a deformable disk secured to the piston rod at a part which normally moves within the cylinder bore, and means for reciprocating said piston rod, said beveled edge and said deformable disk being adapted upon the reciprocation of said piston and piston rod to form a seal along the circumference of any one of a plurality of circles on said disk spaced radially from the center thereof.

WALLACE F. OLIVER.